Jan. 27, 1948.  R. H. WORRALL  2,434,977
RADIO DIRECTION FINDER
Filed Aug. 31, 1937
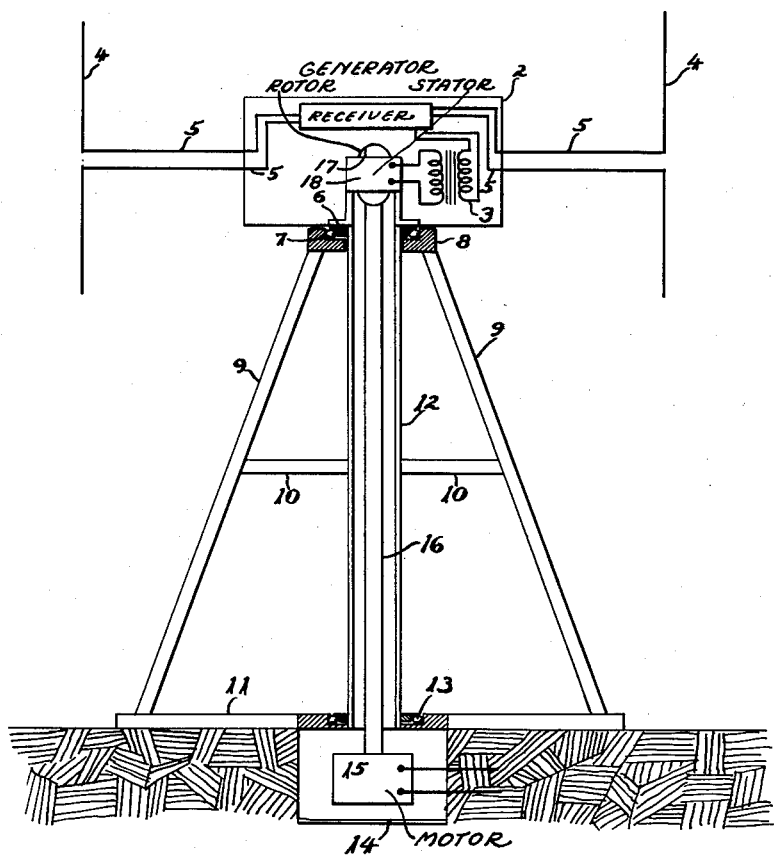
INVENTOR
ROBERT H. WORRALL
BY
ATTORNEY Patented Jan. 27, 1948

2,434,977

UNITED STATES PATENT OFFICE 2,434,977

RADIO DIRECTION FINDER

Robert H. Worrall, Washington, D. C.

Application August 31, 1937, Serial No. 161,722

6 Claims. (Cl. 343—115)

(Granted under the act of March 3, 1883, as amended April 30, 1928; 370 O. G. 757)

This invention relates in general to radio direction finders, and in particular to means for mounting such direction finders and means for supplying energy thereto.

An object of the invention is to provide means for supplying necessary power to a rotatable wave receiver without using external connecting wires.

Another object of the invention is to provide a source of electrical power within the housing of a wave receiver, effectively shielded from external electrical effects and from ground.

Still another object of the invention is to provide a suitable direction finder mounting upon which a direction finding apparatus may be rotated freely without interference from external connecting power wires.

The invention finds particularly useful application in the direction finder art where it is desired to place the receiver at the midpoint of the horizontal dimension of a collector system, where it is convenient to amalgamate all power supply units into a single source, where it is important that the entire direction finder system be shielded and isolated from ground, and where the use of batteries is to be avoided.

Other useful objects and applications of the invention will be apparent from the description which follows.

The drawing is a front elevation in section, showing one embodiment of all the elements of the invention.

The housing 2 contains any form of receiver or wave responsive device, suitable for direction finding purposes, and it is located centrally between dipole collector units 4. Collector units 4 are connected to the receiver proper by the transmission lines 5. Housing 2 is secured to a bearing plate 6 which rests upon a ball race 7 within the bearing support 8, which supports the entire weight of the assembly attached to housing 2. The member 8 is sustained in a horizontal position above ground by a supporting framework comprising the struts 9 and 10 and the horizontal base 11 upon the ground. A tube 12, preferably non-metallic but which may be made up of alternate metallic and non-metallic sections, is secured to the housing 2 around an opening therein and extends perpendicularly downward therefrom to the guide bearing 13 in the base 11. Bearing 13 is not designed to support weight and may be of any type suitable for preventing lateral play of the lower end of tube 12. Below the surface of the ground, directly beneath the lower end of tube 12, connected electrically to ground and secured to the under side of base 11, is a metal box 14. Within the box 14 is an electric motor 15, whose insulated shaft 16 extends vertically through the center of the tube 12 to join the rotor 17 of a generator whose stator 18 is secured within the housing 2. Generator 17, 18, driven by motor 15, supplies all necessary power to transformer 3 of the receiver or wave responsive device within the housing 2. This generator may be of any type suitable for the purpose; a convenient and effective type has been found to be a two pole, A. C. induction generator.

A non-electrical source of power may be substituted for the motor 15, for example, an air driven propeller as used in aircraft. In such a case, the box 14 may be dispensed with and the driving source for the generator may be placed in any convenient location relative thereto.

By virtue of the construction described, the entire assembly comprising the housing, receiver, collector units, generator stator, and non-metallic tube may be freely rotated in bearings 8 and 13, around the generator rotor 17 as an axis, free from entangling electrical leads or any metallic connection with the earth.

The tube 12 and the driving shaft 16 may be jointed or made up of alternate insulated sections if desired, for purposes of portability or facility of manufacture. When mechanical considerations of rigidity and rotatability will permit, for example when the housing 2 and the assembly connected therewith are relatively small and light in weight the tube 12 may be eliminated entirely from the apparatus without altering the electrical properties thereof. While the shaft 16 is shown and described as insulated, an uninsulated shaft in its place will permit the accomplishment of useful results within the scope of the invention.

The output of the receiver proper may be connected in any conventional manner to a signal responsive device and such device may be mounted integrally with the housing 2.

While a detailed description has been given of a specific embodiment of the invention, it will be understood that the invention is susceptible to changes in form, size, materials, location of parts, and other details without departing from the scope thereof.

The invention described herein may be manufactured and used by or for the Government of the United States of America for governmental purposes without the payment of any royalties thereon or therefor.

Having thus set forth and disclosed the nature of this invention, what is claimed is:

1. In a radio direction finder, a wave sensitive receiver, a housing for said receiver, a generator to supply power to said receiver located within said housing and having its stator secured thereto, collecting means connected to said receiver and mounted integrally with said housing, supporting means for sustaining said housing and parts connected therewith at a height above the ground upon which said supporting means rests, bearing means associated with said supporting means and said housing to permit free rotation of said housing and parts connected therewith about an axis passing through the rotor of said generator, a non-metallic tube secured to said housing and extending downward to the ground, generator-driving means located below the surface of the ground, a grounded metal box enclosing said driving means, and an insulated drive shaft connecting said driving means with the rotor of said generator, said drive shaft extending through said non-metallic tube and through apertures in said box and said housing.

2. In a radio direction finder, a wave sensitive receiver, a housing for said receiver, a generator to supply power to said receiver located within said housing and having its stator secured thereto, collecting means connected to said receiver and mounted integrally with said housing, supporting means for sustaining said housing and parts connected therewith in an elevated position relative to a base plane upon which said supporting means rests, bearing means associated with said supporting means and said housing to permit free rotation of said housing and parts connected therewith about an axis passing through the rotor of said generator, a non-metallic tube secured to said housing and extending to said base plane, electrical generator-driving means located subjacent to said base plane, a grounded metal box enclosing said driving means, and a drive shaft connecting said driving means with the rotor of said generator, said drive shaft extending through said non-metallic tube and through apertures in said box and said housing.

3. In a radio direction finder, a wave sensitive receiver, a housing for said receiver, a generator to supply power to said receiver located within said housing and having its stator secured thereto, collecting means connected to said receiver and mounted integrally with said housing, supporting means for sustaining said housing and parts connected therewith in a position relative to a base plane, bearing means associated with said supporting means and said housing to permit free rotation of said housing and parts connected therewith about an axis passing through the rotor of said generator, an insulated tube secured to said housing and extending to said base plane, bearing means to prevent lateral motion of the end of said tube adjacent to said base plane, electrical generator-driving means located posterior to said base plane, a grounded metal box enclosing said driving means, and a drive shaft connecting said driving means with the rotor of said generator, said drive shaft extending through said non-metallic tube and through apertures in said box and said housing.

4. In a radio direction finder, a wave sensitive receiver, a housing for said receiver, a generator to supply power to said receiver located within said housing and having its stator secured thereto, supporting means for sustaining said housing and parts connected therewith in a position relative to a base plane, bearing means associated with said supporting means and said housing to permit free rotation of said housing and parts connected therewith about an axis passing through the rotor of said generator, an insulated tube secured to said housing and extending to said base plane, electrical generator-driving means located proximate to said base plane, a grounded metal box enclosing said driving means, and an insulated drive shaft connecting said driving means with the rotor of said generator, said drive shaft extending through said non-metallic tube and through apertures in said box and said housing.

5. In a radio direction finder, a wave sensitive receiver, a housing for said receiver, a generator to supply power to said receiver having its stator secured to said housing, supporting means for sustaining said housing and parts connected therewith in a position relative to a base plane, bearing means associated with said supporting means and said housing to permit free rotation of said housing and parts connected therewith about an axis passing through the rotor of said generator, means for driving said generator, and a drive shaft connecting said driving means with the rotor of said generator, said drive shaft lying substantially in the axis of rotation of said housing.

6. Apparatus as described, comprising a housing, radio signal responsive means in said housing, means supporting said housing spaced from the earth, means mounting said housing on said supporting means for rotation with respect to said supporting means, a power supply source in said housing, said source including a stator fixed to said housing and a rotor having its axis of rotation substantially in the axis of rotation of said housing, a prime mover adjacent the base of said supporting means, and an electrically non-conductive mechanical driving connection from said prime mover to said rotor along the axis of rotation of said housing, whereby to drive said rotor during rotation of said housing, and keep said housing electrically insulated from ground.

ROBERT H. WORRALL.

REFERENCES CITED

The following references are of record in the file of this patent:

UNITED STATES PATENTS

| Number | Name | Date |
| --- | --- | --- |
| 1,411,814 | Stoller | Apr. 4, 1922 |
| 1,569,325 | Leib | Jan. 12, 1926 |
| 1,910,063 | Schuchman | May 23, 1933 |
| 2,093,432 | Gordon | Sept. 21, 1937 |
| 2,120,366 | Leib et al. | June 14, 1938 |

OTHER REFERENCES

Proceedings IRE Jan. 1936, page 29.